United States Patent
Moore et al.

(10) Patent No.: US 9,732,224 B2
(45) Date of Patent: Aug. 15, 2017

(54) POLYBENZIMIDAZOLE/POLYVINYLBUTYRAL MIXTURES

(75) Inventors: John C. Moore, Camarillo, CA (US); Gregory S. Copeland, Tega Cay, SC (US); Michael Gruender, Charlotte, NC (US)

(73) Assignee: PBI Performance Products, Inc., Charlotte, NC (US)

( * ) Notice: Subject to any disclaimer, the term of this patent is extended or adjusted under 35 U.S.C. 154(b) by 882 days.

(21) Appl. No.: 13/474,785

(22) Filed: May 18, 2012

(65) Prior Publication Data

US 2013/0309471 A1    Nov. 21, 2013

(51) Int. Cl.
- *C08L 79/04* (2006.01)
- *C09D 179/04* (2006.01)
- *C08G 73/18* (2006.01)

(52) U.S. Cl.
CPC ............ *C08L 79/04* (2013.01); *C08G 73/18* (2013.01); *C09D 179/04* (2013.01)

(58) Field of Classification Search
CPC .......... C08L 59/02; C08L 59/04; C08L 77/10; C08K 5/0016; C09D 159/02; C09D 159/04; C09D 177/10
USPC ............................ 428/220; 524/538; 525/426
See application file for complete search history.

(56) References Cited

U.S. PATENT DOCUMENTS

| | | | |
|---|---|---|---|
| 4,506,068 A * | 3/1985 | Choe | C08G 73/18 528/207 |
| 5,549,946 A | 8/1996 | Iura et al. | |
| 5,674,614 A | 10/1997 | Onishi et al. | |
| 5,686,213 A * | 11/1997 | Cosgrove | G03G 5/047 430/127 |
| 5,725,953 A | 3/1998 | Onishi et al. | |
| 5,998,027 A | 12/1999 | Onishi et al. | |
| 7,005,674 B2 | 2/2006 | Lee et al. | |
| 7,166,412 B2 | 1/2007 | Park et al. | |
| 7,960,458 B2 | 6/2011 | Mikami et al. | |
| 2003/0222242 A1 * | 12/2003 | Harada | C09K 19/54 252/299.5 |
| 2006/0252325 A1 * | 11/2006 | Matsumura | B32B 5/02 442/123 |
| 2007/0088118 A1 | 4/2007 | Dungworth et al. | |
| 2010/0018926 A1 | 1/2010 | Liu et al. | |
| 2010/0305236 A1 * | 12/2010 | Scholz | B82Y 30/00 523/402 |
| 2011/0129601 A1 | 6/2011 | Moore et al. | |

OTHER PUBLICATIONS

Gierenz. Adhesives and Adhesive Tapes. Dec. 2001. Wiley-VCH, p. 40.*
Solutia. Butvar® Polyvinyl Butyral Resin: Properties and Uses. SOLUTIA. pp. 1-28.*
U.S. Appl. No. 13/163,836, Jun. 20, 2011, Moore et al.
Greg S. Copeland et al., "Thermal Resistant Coatings Using PBI Resin," SAMPE Conference, Baltimore, MD, (May 2012).

* cited by examiner

*Primary Examiner* — Maria Veronica Ewald
*Assistant Examiner* — Ethan Weydemeyer
(74) *Attorney, Agent, or Firm* — Hammer & Associates, P.C.

(57) ABSTRACT

The polymer mixture comprises polybenzimidazole (PBI)/polyvinylbutyral (PVB). The weight ratio (PVB:PBI) of this mixture may range from 0.25-50:50-99.75 or 15-85:15-85. The coating is based upon the polymer mixture.

13 Claims, 8 Drawing Sheets

POLYBENZIMIDAZOLE/POLYVINYLBUTYRAL MIXTURES

FIELD OF THE INVENTION

The instant invention is directed to polybenzimidazole (PBI)/polyvinylbutyral (PVB) mixtures and coatings.

BACKGROUND OF THE INVENTION

PBI based coatings are known. In U.S. Pat. No. 5,549,946, a PBI varnish is used to coat a metallic roll in a copying machine. In U.S. Pat. No. 5,674,614, U.S. Pat. No. 5,725,953, and U.S. Pat. No. 5,998,027, PBI varnishes are used to insulate electrical wire.

Mixtures of PBI and PVB have been prophetically mentioned for use is some applications. In U.S. Pat. No. 7,005,674, a PBI/PVB mixture is prophetically mentioned for use as an insulating layer in an organic thin film transistor (OTFT). In U.S. Pat. No. 7,166,412, a PBI/PVB mixture is prophetically mentioned for use as a non-conducting polymer carrier of photosensitive metal nanoparticles. In U.S. Pat. No. 7,960,458, a PBI/PVB mixture is prophetically mentioned as a resin composition carrier for a flame retardant.

There is a need for improved coatings, specifically coatings based on PBI and its unique chemical, physical, and electrical properties.

SUMMARY OF THE INVENTION

The polymer mixture comprises polybenzimidazole (PBI)/polyvinylbutyral (PVB). The weight ratio (PVB:PBI) of this mixture may range from 0.25-50:50-99.75 or 15-85:15-85. The coating is based upon the polymer mixture. The blend of PBI and PVB has, among other things, a better moisture resistance than PBI alone, and hence, a better adhesion to the substrate after immersion in water than PBI alone.

DESCRIPTION OF THE DRAWINGS

For the purpose of illustrating the invention, there is represented in the figures data from various embodiments of the invention; it being understood, however, that this invention is not limited to the data shown and that this data has not necessarily been optimized, but instead only indicates the possibilities for the inventive materials.

DESCRIPTION OF THE INVENTION

Figure 1:
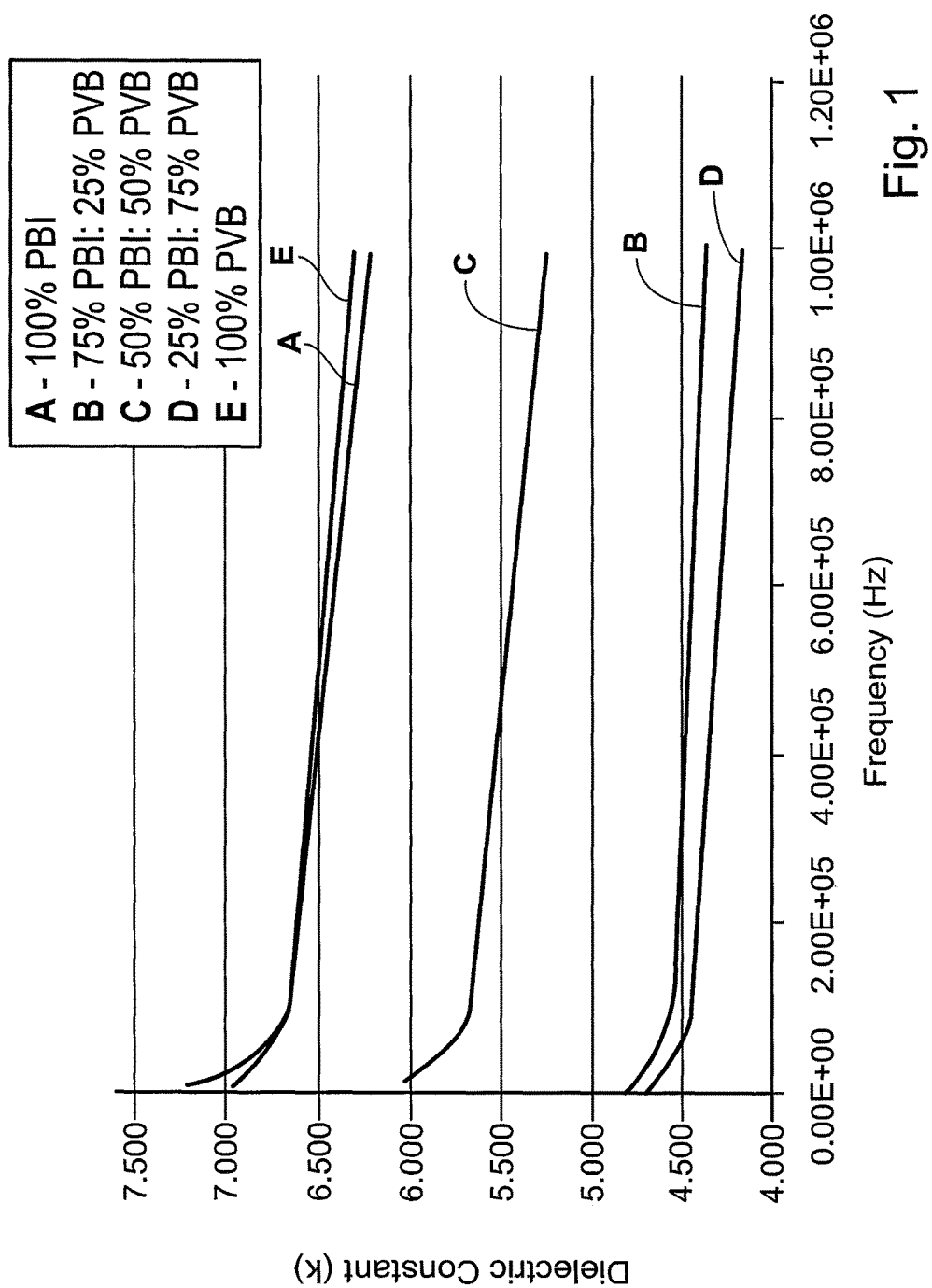
FIG. 1 is a graph of the dielectric constants of blends of the inventive materials at various weight ratios.

The instant invention is directed to blends or mixtures of polybenzimidazole (PBI) and polyvinylbutyral (PVB) and coatings made therefrom. The blend of PBI and PVB has, among other things, a better moisture resistance than PBI alone, and hence, a better adhesion to the substrate after immersion in water than PBI alone.

Polybenzimidazole (PBI) as used herein refers to PBI, blends of PBI with other polymers, co-polymers of PBI, and combinations thereof. In one embodiment, the PBI component is the major (i.e., at least 50 wt %) component. Polybenzimidazole (PBI) refers to, for example, the product of the melt polymerization of a tetraamine (e.g., aromatic and heteroaromatic tetra-amino compounds) and a second monomer being selected from the group consisting of free dicarboxylic acids, alkyl and/or aromatic esters of dicarboxylic acids, alkyl and/or aromatic esters of aromatic or heterocyclic dicarboxylic acid, and/or alkyl and/or aromatic anhydrides of aromatic or heterocyclic dicarboxylic acid. Further details may be obtained from U.S. Pat. Nos. Re 26065; 4,506,068; 4,814,530; and US Publication No. 2007/0151926, each of which is incorporated herein by reference. PBI is commercially available from PBI Performance Products, Inc. of Charlotte, N.C.

The aromatic and heteroaromatic tetra-amino compounds, used in accordance with the invention, are preferably 3,3',4,4'-tetra-aminobiphenyl, 2,3,5,6-tetra-aminopyridine, 1,2,4,5-tetra-aminobenzene, 3,3',4,4'-tetra-aminodiphenylsulfone, 3,3',4,4'-tetra-aminodiphenyl ether, 3,3',4,4'-tetra-aminobenzophenone, 3,3',4,4'-tetra-aminodiphenyl methane, and 3,3',4,4'-tetra-aminodiphenyldimethylmethane, and their salts, in particular, their mono-, di-, tri-, and tetrahydrochloride derivatives.

The aromatic carboxylic acids used, in accordance with the invention, are dicarboxylic acids or its their esters, or its their anhydrides or their acid chlorides. The term "aromatic carboxylic acids" equally comprises heteroaromatic carboxylic acids as well. Preferably, the aromatic dicarboxylic acids are isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-napthalenedicarboxylic acid, diphenic acid, 1,8-dihydroxynaphthalene-3,6-dicarboyxlic acid, diphenyl ether-4,4'-dicarboxylic acid, benzophenone-4,4'-dicarboxylic acid, diphenylsulfone-4,4'-dicarboyxlic acid, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid, or their C1-C20-alkyl esters or C5-C12-aryl esters, or their acid anhydrides or their acid chlorides.

The heteroaromatic carboxylic acids used, in accordance with the invention, are heteroaromatic dicarboxylic acids or their esters or their anhydrides. The "heteroaromatic dicarboxylic acids" include aromatic systems that contain at least one nitrogen, oxygen, sulfur, or phosphorus atom in their ring. Preferably, it is pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridine dicarboxylic acid, 3,5-pyrazole dicarboxylic acid, 2,6-pyrimidine dicarboxylic acid, 2,5-pyrazine dicarboxylic acid, 2,4,6-pyridine tricarboxylic acid, and benzimidazole-5,6-dicarboxylic acid, as well as their C1-C20-alkyl esters or C5-C12-aryl esters, or their acid anhydrides or their acid chlorides.

The aromatic and heteroaromatic diaminocarboxylic acid used in accordance with the invention is preferably diaminobenzoic acid and its mono- and dihydrochloride derivatives.

Preferably, mixtures of at least 2 different aromatic carboxylic acids are used. These mixtures are, in particular, mixtures of N-heteroaromatic dicarboxylic acids and aromatic dicarboxylic acids or their esters. Non-limiting examples are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynapthalene-3,6-dicarboxylic acid, diphenyl ether-4,4'-dicarboxylic acid, benzophenone-4,4'-dicarboxylic acid, diphenylsulfone-4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidine dicarboxylic acid, and 2,5-pyrazine dicarboxylic acid. Preferably, it is the diphenyl isophthalate (DPIP) and its ester.

Examples of polybenzimidazoles which may be prepared according to the process as described above include:
poly-2,2'-(m-phenylene)-5,5'-bibenzimidazole;
poly-2,2'-(biphenylene-2"2'")-5,5'-bibenzimidazole;
poly-2,2'-(biphenylene-4"4'")-5,5'-bibenzimidazole;
poly-2,2'-(1",1",3"trimethylindanylene)-3"5"-p-phenylene-5,5'-bibenzimidazole;
2,2'-(m-phenylene)-5,5'-bibenzimidazole/2,2-(1",1",3"-trimethylindanylene)-5",3"-(p-phenylene)-5,5'-bibenzimidazole copolymer;
2,2'-(m-phenylene)-5,5'-bibenzimidazole-2,2'-biphenylene-2",2'"-5,5'-bibenzimidazole copolymer;
poly-2,2'-(furylene-2",5")-5,5'-bibenzimidazole;
poly-2,2'-(naphthalene-1",6")-5,5'-bibenzimidazole;
poly-2,2'-(naphthalene-2",6")-5,5'-bibenzimidazole;
poly-2,2'-amylene-5,5'-bibenzimidazole;
poly-2,2'-octamethylene-5,5'-bibenzimidazole;
poly-2,2'-(m-phenylene)-diimidazobenzene;
poly-2,2'-cyclohexenyl-5,5'-bibenzimidazole;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2,2"-(m-phenylene)-5,5"-di(benzimidazole)propane-2,2; and
poly-ethylene-1,2-2,2"-(m-phenylene)-5,5"-dibenzimidazole)ethylene-1,2
where the double bonds of the ethylene groups are intact in the final polymer. Poly-2,2'-(m-phenylene)-5,5'-bibenzimidazole, a preferred polymer, can be prepared by the reaction of 3,3',4,4'-tetraminobiphenyl with a combination of isophthalic acid with diphenyl isophthalate or with a dialkyl isophthalate such as dimethyl isophthalate; a combination of diphenyl isophthalate and a dialkyl isophthalate such as dimethyl isophthalate; or at least one dialkyl isophthalate such as dimethyl isophthalate, as the sole dicarboxylic component.

The PBI polymer may have an IV (inherent viscosity) in the range of 0.10-2.00 dL/g. IV (inherent viscosity), as used herein, is the ratio of the specific viscosity of a solution of known concentration to the concentration of the solute extrapolated to zero concentration, measured in units of dL/g (deciliters/gram). It is directly proportional to the polymer-average molecular weight, and is based on the concentration of the polymer sample tested, g/100 ml or g/deciliter. The polymer is dissolved at the 0.4% (w/v) level in 100 ml of 96.5% (+/−0.5%) sulfuric acid at 80° C. After filtering, an aliquot is measured for IV using a calibrated Cannon-Fenske capillary viscometer in a 25° C. (+/−0.1° C.) water bath, the flow time (sec.) of the PBI polymer solution measured vs. the dissolving solvent: $IV=ln(t_1/t_2)/c$, where the natural log of the flow time of the PBI solution $(t_1)$ over the flow time of the solvent $(t_2)$ is divided by the PBI solution concentration (c). In one embodiment, the IV may be ≥0.4 dL/g.

Polyvinylbutyral (PVB) as used herein refers to PVB, blends of PVB with other polymers, co-polymers of PVB, and combinations thereof. In one embodiment, the PVB component is the major (i.e., at least 50 wt %) component. PVB is the condensation product of polyvinyl alcohol and butyraldehyde in the presence of an acid catalyst (e.g., sulfuric acid). One co-polymer may be the reaction product of polyvinyl alcohol, butyraldehyde and acetaldehyde. PVB is commercially available as: BUTACITE (in film form) from DuPont of Wilmington, Del.; SAFLEX (in film form) from Solutia of St. Louis, Mo.; TROSIFOL (in film form), MOWITAL (resin), PIOLOFORM (co-polymer) from Kuraray Europe GmbH of Frankfurt, Germany; and S-LEC (film and resin) from Sekisui of Kyoto, Japan.

Prior to forming the coating, the PBI and PVB are mixed. In one embodiment, a solution of PBI and a solution of PVB are blended together. In another embodiment, the PBI and PVB may be dissolved in a single solvent (or solvent mixture). The solutions may contain in the range of 5-35% solids (solids being the weights of the PBI and PVB resins). In another embodiment, the solution may contain in the range of 5-30% solids. In another embodiment, the solution may be in the range of 5-20% solids.

The solvent used to make the foregoing solutions may be capable of dissolving (or at least be miscible with) the PBI and PVB. The carrier solvent may be: N,N-dimethylacetamide (DMAc); N,N-dimethylacrylamide (DMAA), N,N-dimethylformamide (DMF), dimethylsulfoxide (DMSO), and N-methyl-2-pyrrolidone (NMP), azo bis isobutyronitrile (AIBN), 1,3-dioxolane (dioxolane) and combinations thereof. In one embodiment, the solvent may be N,N-dimethylacetimide (DMAc).

The PBI/PVB solution may also include various additives and/or process steps to affect the final coatings qualities. For example, the addition of 1-10% by weight silica (hydrophilic and hydrophobic) was used to enhance the appearance of the resulting coating. An additional cure at 330° C. for 15 minutes was used to enhance the appearance of the resulting coating. Passivation of the substrate was used to enhance the appearance of the resulting coating and had the additional benefit of increasing the electrical resistance of the coating. The step of building the coating with more than one layer was used to enhance the appearance of the resulting coating.

The foregoing solutions may then be coated onto a substrate. Preferably, prior to any coating operation the substrate is prepared by removal of any surface materials that may impede adherence of the coat or have a detrimental effect on the coat's chemical, electrical, and or physical properties. This pre-treatment may be an acidic, alkaline, or surfactant based treatment. This coating operation may be any known coating operation, for example, brushing, spraying, dipping, wiping, and/or spin coating. The coating is thereafter dried. The drying operation may be any drying step where the solvent is driven off, e.g., by application of heat, forced gas, and/or vacuum. A primer may used to improve adhesion of the coating to the substrate.

The resulting coating may comprise, in one embodiment, a weight ratio of PVB:PBI in the range of 15-85:15-85; or in another embodiment, 20-80:20-80; or in yet another embodiment, 25-75:25-75. In another, the coating may comprise a majority (>50%) of PBI and a minority (<50%) of PVB; or a PVB:PBI weight ratio in the range of 0.25-50: 50-99.75; or 1-45:55-99.75; or 3-45:55-97; or 5-45:55-95; or 7-45:55-93. The blend of PBI and PVB has, among other things, a better moisture resistance than PBI alone, and hence, a better adhesion to the substrate after immersion in water than PBI alone.

The resulting coatings may have any thickness, but in one embodiment the thickness may range from 1-75 microns. In another embodiment, the thickness may range from 1-50 microns. In another embodiment, the thickness may range from 2-40 microns. In yet another embodiment, the thickness may range from 4-25 microns. To obtain the desired thickness, the coating may be built-up by forming one of more layers of the mixture, with a drying function optionally exercised between each application of the mixture.

EXAMPLES

The following examples further illustrate the invention; it being understood, however, that this invention is not limited to the precise formulations set forth.

Example 1

In the following example, the adhesion properties of coatings of PBI/PVB are compared to the adhesion properties of coatings of PBI. PBI coatings were made from stock PBI dope (26.2 wt. % solids in DMAc available from PBI Performance, Inc. of Charlotte, N.C., USA). PBI/PVB coatings were made by first preparing a PVB dope (20-25 wt. % solids in DMAc, PVB being MOWITAL® B30HH available from Kuraray Specialties Europe GmbH of Frankfurt am Main, Germany), and then, blending the PVB dope with the PBI dope to the desired weight ratio (i.e., weight solids ratio). The dopes were then applied to the substrate (e.g., stainless steel, cleaned by treating for 5 minutes in a 5 wt. % aqueous solution of TSP (tri sodium phosphate) at 80° C., then thoroughly rinsing (e.g., three times with DI (deionized) water), and then dried with a paper towel). The dopes were brushed onto the substrates. The dope coated substrates were cured at 250° C. or 380° C. for 5 minutes. Coatings of various thicknesses (measured by profilometer micrometer, and reported as an average), were tested for adhesion after hot water immersion. Coatings greater than 5 microns (μm) were obtained by applying the dope to the substrate, curing, and re-applying/curing the dope (each application being approximately the same thickness) until the desired thickness was achieved. After achieving the desired thickness, the samples were immersed in hot water (i.e., 70-80° C.) for 30 minutes. Finally, the water immersed, cured coatings were subjected to a cross-hatch adhesion test (ASTM D3359-97). The results are reported in TABLE 1 below. The blend of PBI and PVB has, among other things, a better moisture resistance than PBI alone, and hence, a better adhesion to the substrate after immersion in water than PBI alone.

TABLE 1

| Coating | Weight Ratio | Thickness (μm) | Adhesion after water immersion: Cured at 250° C. | Adhesion after water immersion: Cured at 380° C. |
|---|---|---|---|---|
| PBI | — | 4 | Pass | Fail |
| PBI | — | 8 | Fail | NT* |
| PBI | — | 25 | Fail | NT* |
| PBI/PVB | 3:1 | 4 | Pass | Pass |
| PBI/PVB | 3:1 | 8 | Pass | NT* |
| PBI/PVB | 3:1 | 12 | Pass | NT* |
| PBI/PVB | 3:1 | 25 | Pass | Pass |

*NT—not tested

Example 2

In the following example, the coatability and coatings of PBI/PVB dopes are compared to the coatability and coatings of PBI dope and PVB dope. Each dope consists of the polymer in DMAc. The dopes are spin coated on to a copper (Cu) substrate. The Cu substrate was cleaned, prior to coating, by: washing the substrate in an aqueous (DI water) 2M $H_2SO_4$ for 2 minutes at room temperature; rinsing with DI water; washing with an 5% aqueous (DI water) solution of TSP for 15 minutes at 70-80° C.; rinsing with DI water; rinsing with isopropyl alcohol (IPA); and air drying. The coating results are set forth in TABLE 2.

TABLE 2

| Polymer | Solids in DMAc | Thickness (μm) | RPM/sec |
|---|---|---|---|
| PBI | 12% | 4.0 | 1000/60 |
| PBI:PVB (3:1) | 9% | 2.3 | 1000/10 |
| PBI:PVB (1:1) | 9% | 3.9 | 1000/10 |
| PBI:PVB (1:3) | 9% | 2.0 | 1000/10 |
| PVB | 9% | 0.7 | 1000/10 |

Thereafter, the coated substrates were cured by: 1) heating at 100° C. for 15 minutes, 2) heating at 150° C. for 15 minutes, and 3) heating at 250° C. for 15 minutes. The cured coating observations are set out in TABLE 3.

TABLE 3

| Polymer | Observations |
|---|---|
| PBI | Coating appeared smooth, even, & reflective |
| PBI:PVB (3:1) | Coating appeared smooth, several small voids, & a matte finish |
| PBI:PVB (1:1) | Coating had many voids & a matte finish |
| PBI:PVB (1:3) | Coating had many voids & a matte finish |
| PVB | Coating had abundant pinholes |

Example 3

In the following example, various techniques were tried to modify the cured coating. In each case a PBI:PVB polymer blend with a weight ratio of 3:1 was used and the dope was 9% solids in DMAc. The dopes were applied to the substrate by spin coating and then cured as in Example 2 (except as noted). The various techniques are set forth in TABLE 4.

TABLE 4

| | Polymer | Technique | Thickness (μm) | RPM/sec |
|---|---|---|---|---|
| 1 | PBI:PVB | — | 2.55 | 1000/60 |
| 2 | PBI:PVB | Additionally cured for 15 min at 330° C. | 2.60 | 1000/10 |
| 3 | PBI:PVB | 1% wt. hydrophilic silica[1] added to dope | 2.45 | 1000/10 |
| 4 | PBI:PVB | 1% wt. hydrophobic silica[2] added to dope | 4.00 | 1000/10 |
| 5 | PBI:PVB | Substrate passivated[3] | 3.05 | 1000/10 |
| 6 | PBI:PVB | 2 layers of polymer | 6.10 | 1000/10 |
| 7 | PVB | 2 layers of polymer | 1.55 | 1000/10 |

[1]Aerosil 90 available from Evonik Degussa Corporation, Piscataway, NJ
[2]Aerosil R974 available from Evonik Degussa Corporation, Piscataway, NJ
[3]Cu substrate passivated with an azole (i.e., a mixture of benzotriazole (BTA) and tolyltriazole (TTA)).

The cured coating observations are set out in TABLE 5.

TABLE 5

| | Polymer | Observations |
|---|---|---|
| 1 | PBI:PVB | Coating appeared smooth, several small voids & a matte finish |
| 2 | PBI:PVB | Coating appeared smooth, several small voids, & black |
| 3 | PBI:PVB | Coating appeared uneven, many voids, silica agglomerate mountains (after solvent evaporation silica comprises 10 wt. %) |
| 4 | PBI:PVB | Coating appeared uneven, many voids, some mountains (after solvent evaporation silica comprises 10 wt. %) |
| 5 | PBI:PVB | Coating appeared smooth, even, & a matte finish |
| 6 | PBI:PVB | Coating appeared smooth, even, & a matte finish |
| 7 | PVB | Coating appeared smooth, uneven color, & a reflective finish |

Example 4

In the following Examples, various electrical properties of the PBI:PVB blends (all ratios are by weight) are demonstrated. Coating thicknesses are <5 μm.

Figure 2:
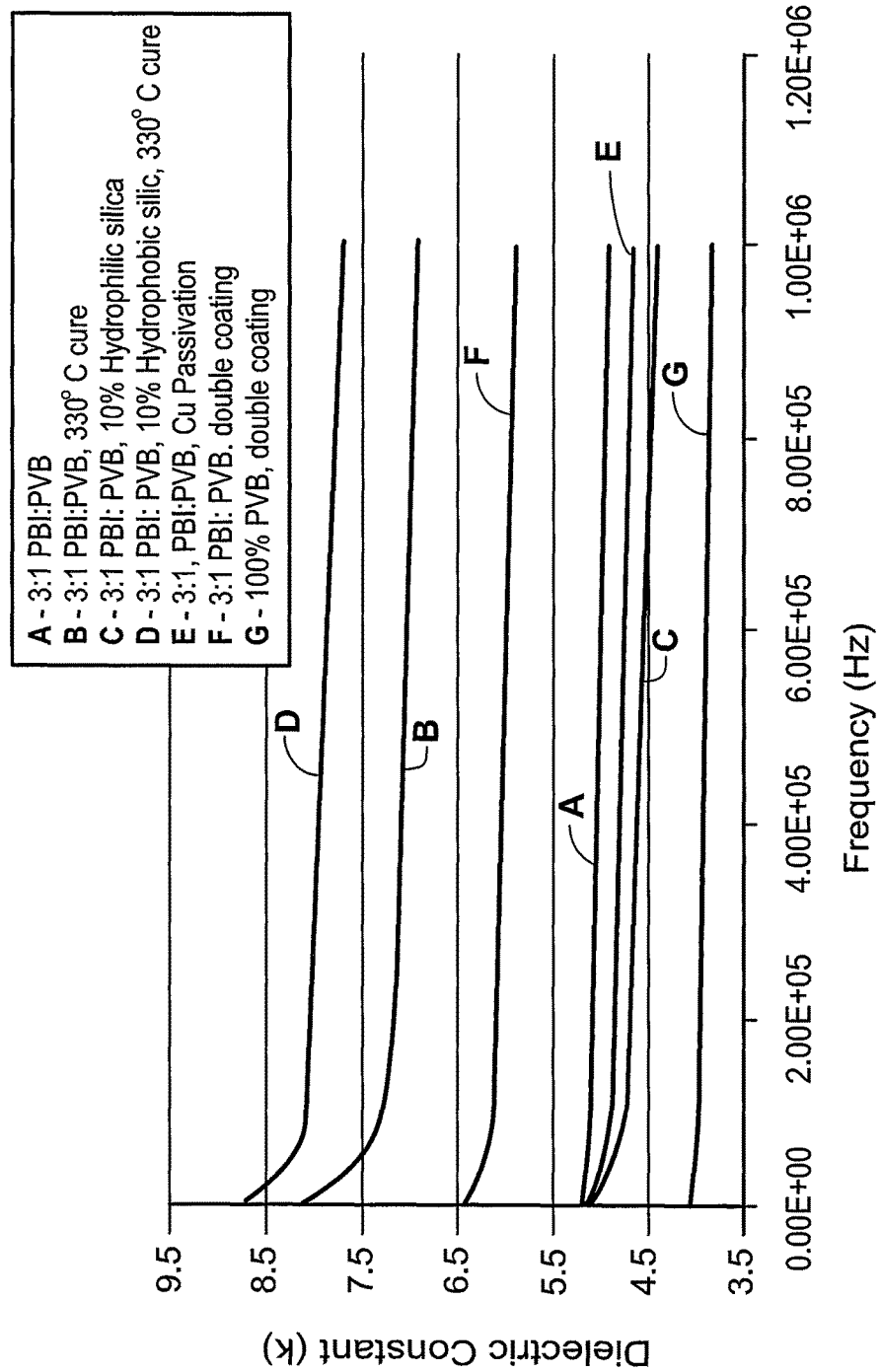
FIG. 2 is a graph of the dielectric constants of a blend of the inventive material with various additives.
Figure 3:
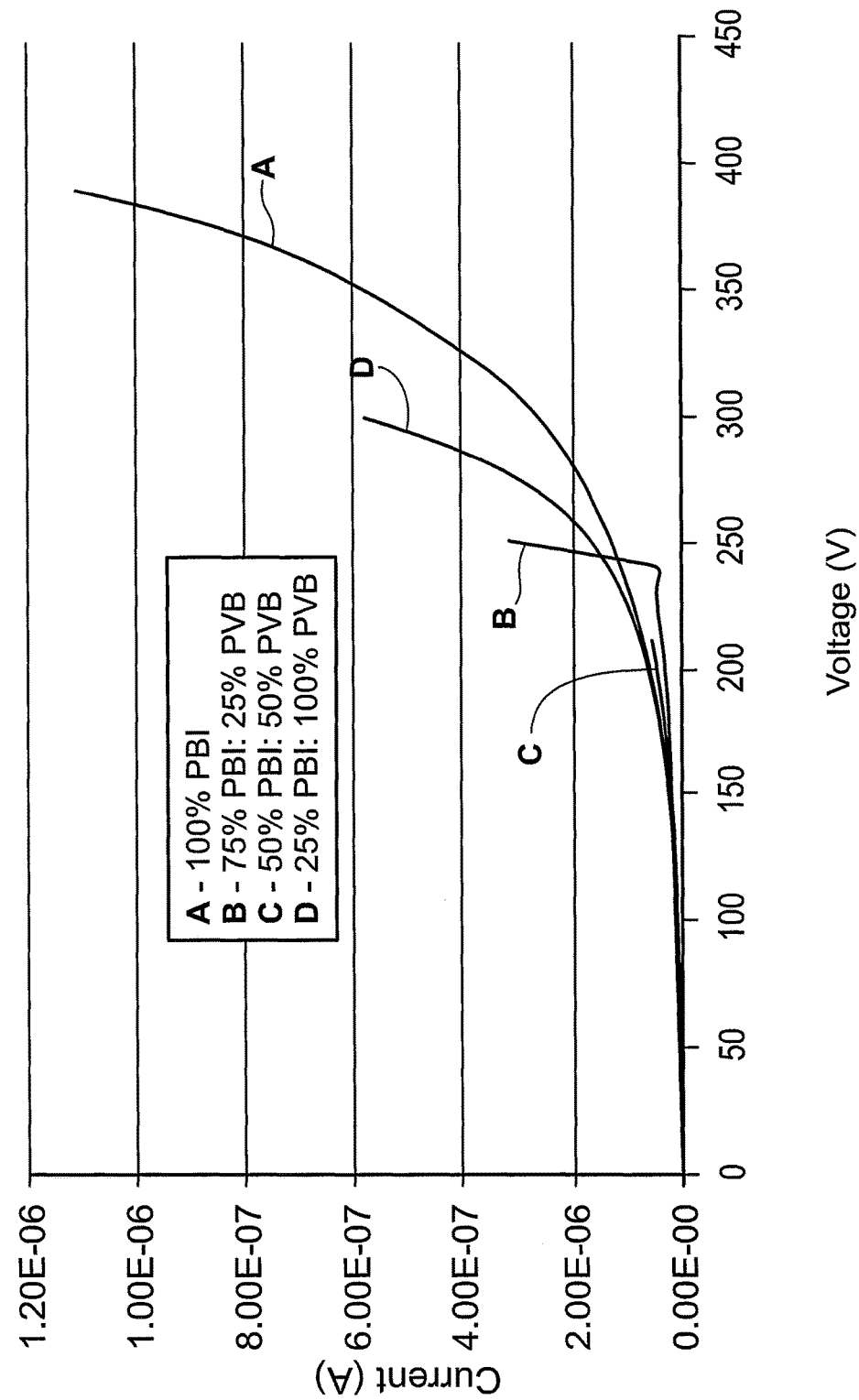
FIG. 3 is a graph of the IV curves of blends of the inventive materials at various weight ratios.

FIGS. 1 and 2 are graphs illustrating the dielectric constant behavior of the foregoing inventive coatings. The dielectric constants were measured using a mercury probe Model No. 802B-150 and testing equipment (CSM/Win system, equipment and software) with an HP 4140B picoammeter source from Material Development Corporation of Chatsworth, Calif. with an I-V plotting program @ 10 mv steps from 0-1V. The samples for FIG. 1 were prepared as set forth in Example 1 above. The samples for FIG. 2 were prepared as set forth in Example 3 (note Table 4).

Figure 4:
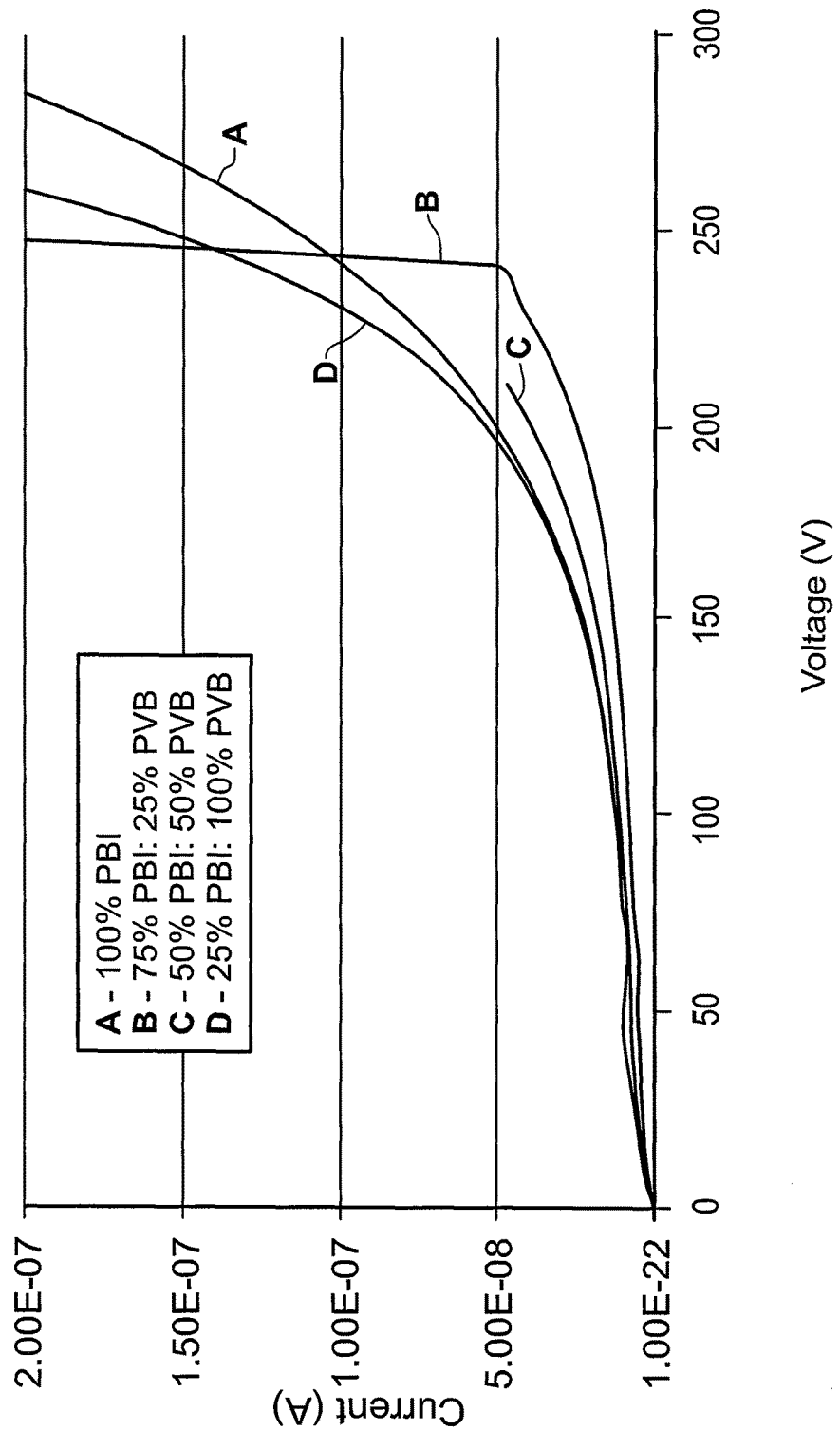
FIG. 4 is a graph of the IV curves of blends at the ROI (region of interest) of the inventive materials at various weight ratios.
Figure 5:
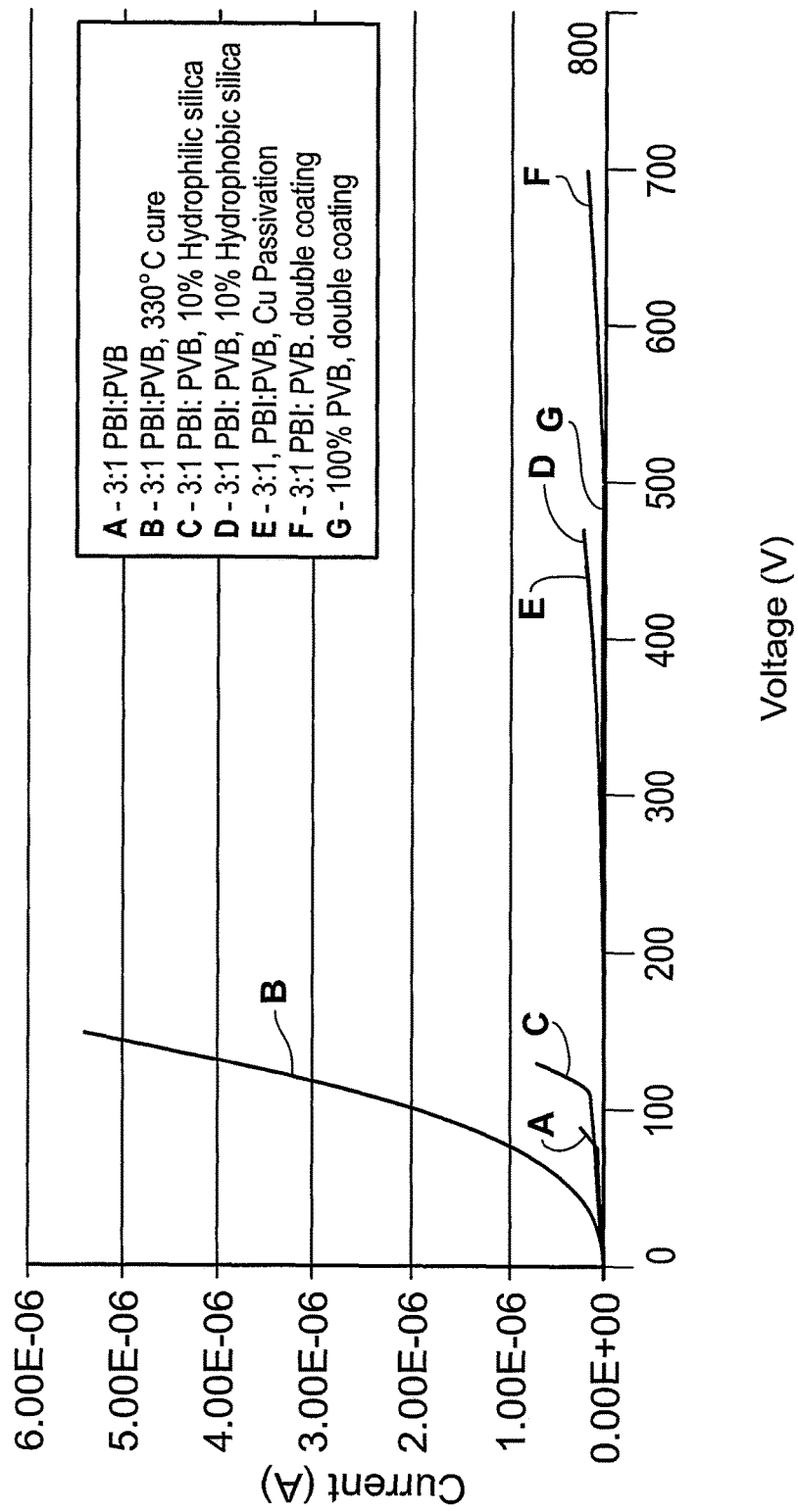
FIG. 5 is a graph of the IV curves of a blend of the inventive material with various additives.
Figure 6:
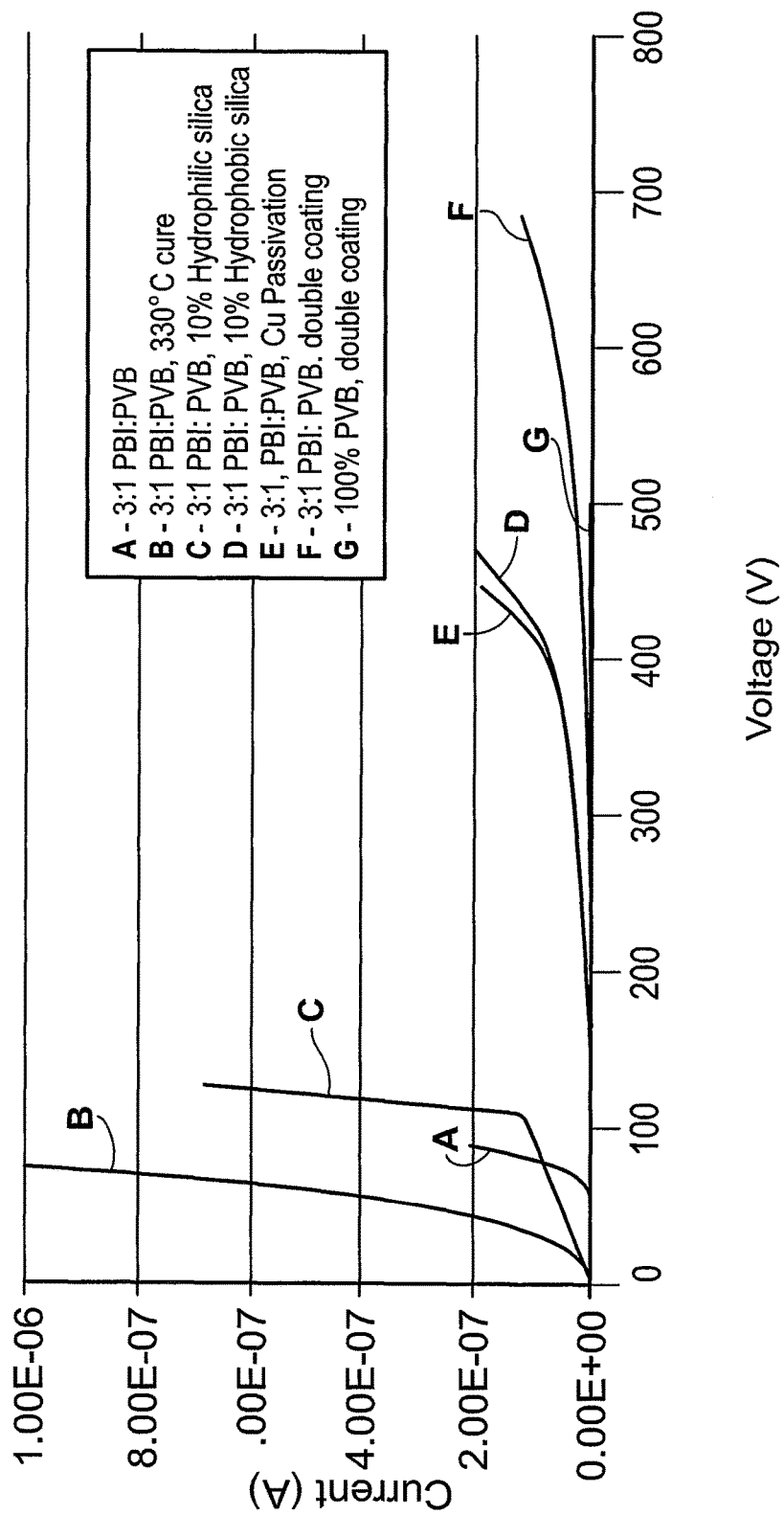
FIG. 6 is a graph of the IV curves of a blend at the ROI (region of interest) of the inventive material with various additives.

FIGS. 3-6 are graphs illustrating the IV (current-voltage) curve behavior of the foregoing coatings. The IV curves were measured using a mercury probe Model No. 802B-150 and testing equipment (CSM/Win system, equipment and software) with an HP 4140B picoammeter source from Material Development Corporation of Chatsworth, Calif. with an I-V plotting program @ 10 mv steps from 0-1V. The samples for FIGS. 3-4 were prepared as set forth in Example 1 above. (FIG. 4 is the same as FIG. 3, except with a different current scale.) The samples for FIGS. 5-6 were prepared as set forth in Example 3 (note Table 4). (FIG. 6 is the same as FIG. 5, except with a different current scale.)

Figure 7:
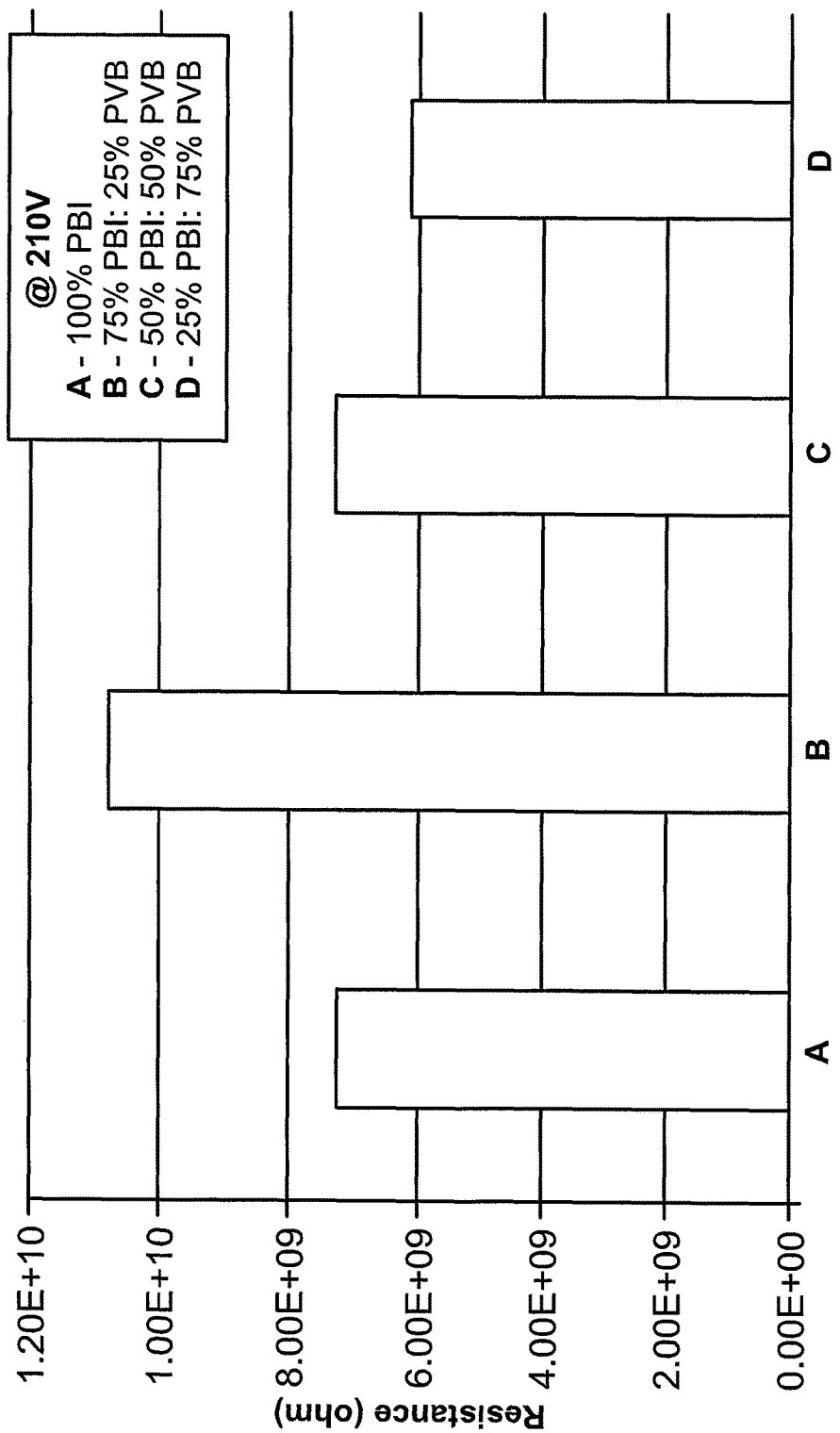
FIG. 7 is a graph of the average resistance at 210 volts of blends of the inventive materials at various weight ratios.
Figure 8:
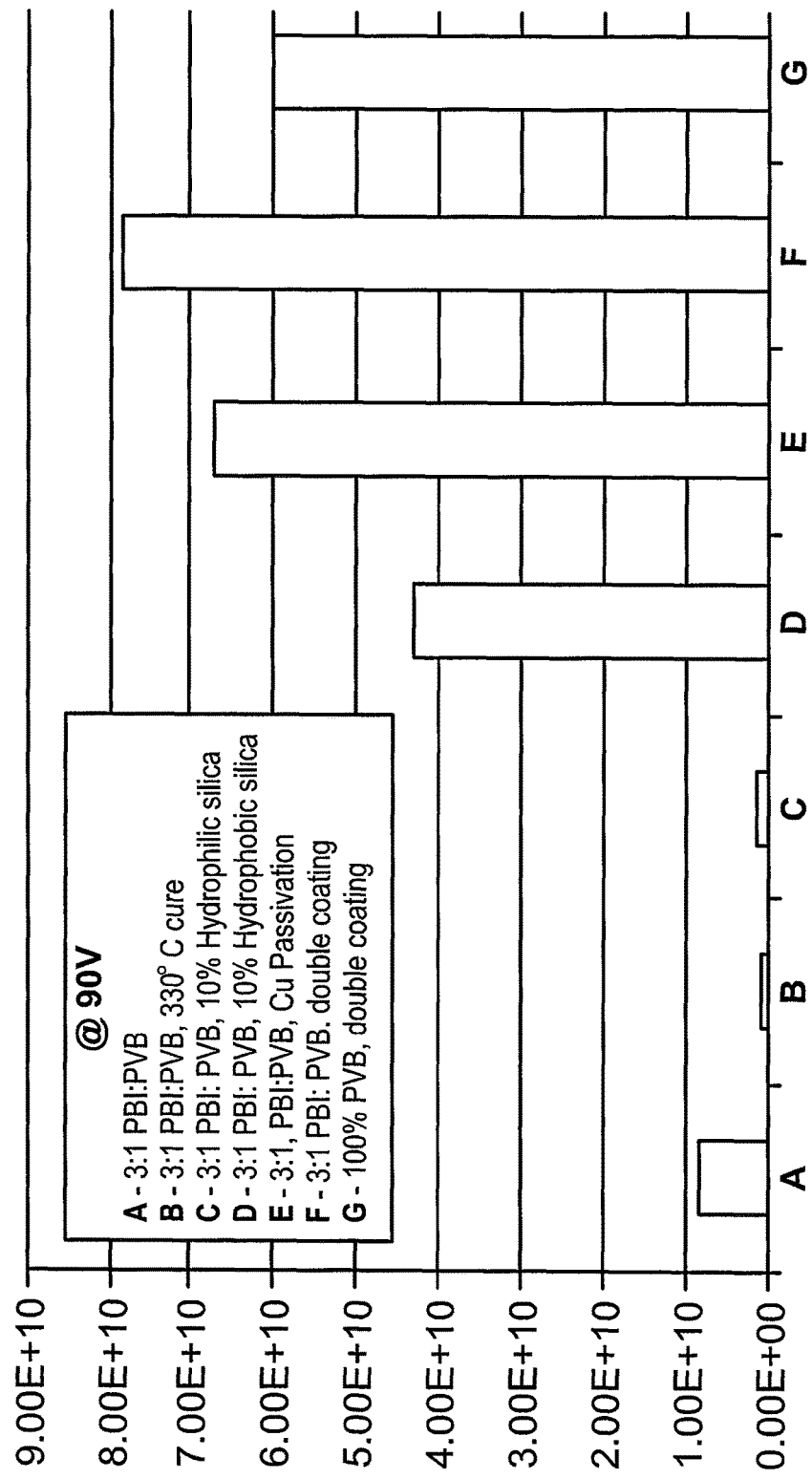
FIG. 8 is a graph of the average resistance at 90 volts of a blend of the inventive material with various additives.

FIGS. 7-8 are graphs illustrating the average resistance (ohms) of the foregoing coatings at a given voltage. The resistance was measured using a mercury probe Model No. 802B-150 and testing equipment (CSM/Win system, equipment and software) with an HP 4140B picoammeter source from Material Development Corporation of Chatsworth, Calif. with an I-V plotting program @ 10 mv steps from 0-1V. The samples for FIG. 7 were prepared as set forth in Example 1 above. The samples for FIG. 8 were prepared as set forth in Example 3 (note Table 4).

The present invention may be embodied in other forms without departing from the spirit and the essential attributes thereof, and, accordingly, reference should be made to the appended claims, rather than to the foregoing specification, as indicating the scope of the invention.

We claim:

1. A polymer mixture consisting of: polybenzimidazole (PBI) resin and polyvinylbutyral (PVB) resin in a PVB:PBI weight ratio in the range of 15-85:15-85.

2. The polymer mixture of claim 1 having the PVB:PBI weight ratio in the range of 20-80:20-80.

3. The polymer mixture of claim 1 having the PVB:PBI weight ratio in the range of 25-75:25-75.

4. A coating consisting of a polymer mixture of polybenzimidazole (PBI) resin and polyvinylbutyral (PVB) resin having a PVB:PBI weight ratio in the range of 15-85:15-85.

5. The coating of claim 4 having a PVB:PBI weight ratio in the range of 25-75:25-75.

6. The coating of claim 4 having a thickness in the range of 1-75 microns.

7. The coating of claim 4 having a thickness in the range of 1-50 microns.

8. The coating of claim 4 having a thickness in the range of 2-40 microns.

9. The coating of claim 4 having a thickness in the range of 4-25 microns.

10. A polymer mixture consisting of: polybenzimidazole (PBI) resin and polyvinylbutyral (PVB) resin in a PVB:PBI weight ratio in the range of 15-85:15-85, the mixture having better moisture resistance than PBI alone.

11. A polymer mixture consisting of: polybenzimidazole (PBI) resin and polyvinylbutyral (PVB) resin in a PVB:PBI weight ratio in the range of 15-85:15-85, the mixture having better adhesion to a substrate after immersion in water than PBI alone.

12. A coating consisting of a polymer mixture of polybenzimidazole (PBI) resin and polyvinylbutyral (PVB) resin having a PVB:PBI weight ratio in the range of 15-85:15-85, the coating having better moisture resistance than PBI alone.

13. A coating consisting of a polymer mixture of polybenzimidazole (PBI) resin and polyvinylbutyral (PVB) resin having a PVB:PBI weight ratio in the range of 15-85:15-85, the coating having better adhesion to a substrate after immersion in water than PBI alone.

* * * * *